United States Patent [19]

Maegawa et al.

[11] Patent Number: 5,694,599
[45] Date of Patent: Dec. 2, 1997

[54] DATA CONTROL SYSTEM FOR A COMPUTER'S MAIN MEMORY FOR EFFICIENTLY REALIZING VIRTUALIZATION OF LIST STRUCTURE DATA LIVING ACROSS A REAL MEMORY SPACE AND A VIRTUAL MEMORY SPACE

[75] Inventors: Hirotoshi Maegawa; Hiroyuki Yasuda, both of Kanagawa-ken, Japan

[73] Assignee: Sony Corporation, Tokyo, Japan

[21] Appl. No.: 649,775

[22] Filed: May 15, 1996

Related U.S. Application Data

[62] Division of Ser. No. 117,337, Sep. 3, 1993, which is a continuation of Ser. No. 548,989, filed as PCT/JP/01249, Dec. 13, 1989.

[30] Foreign Application Priority Data

Dec. 14, 1988 [JP] Japan ................... 63-315652
Mar. 10, 1989 [JP] Japan ................... 1-059390

[51] Int. Cl.$^6$ ........................................ G06F 13/00
[52] U.S. Cl. ............................... 395/622; 395/413
[58] Field of Search ........................ 395/481, 492, 395/493, 413, 622

[56] References Cited

U.S. PATENT DOCUMENTS

| | | | |
|---|---|---|---|
| 4,104,718 | 8/1978 | Poublan et al. | 395/608 |
| 4,253,145 | 2/1981 | Goldberg | 395/500 |
| 4,558,413 | 12/1985 | Schmidt et al. | 39/619 |
| 4,761,746 | 8/1988 | Tano et al. | 395/64 |
| 4,775,932 | 10/1988 | Oxley et al. | 395/622 |
| 4,783,752 | 11/1988 | Kaplan et al. | 395/64 |
| 4,807,120 | 2/1989 | Courts | 395/622 |
| 4,814,971 | 3/1989 | Thatte | 395/182.13 |
| 4,831,541 | 5/1989 | Eshel | 395/406 |
| 4,882,691 | 11/1989 | Schor | 395/64 |
| 4,890,240 | 12/1989 | Loeb et al. | 395/51 |
| 4,905,138 | 2/1990 | Bourne | 395/707 |
| 4,907,151 | 3/1990 | Bartlett | 395/493 |
| 4,912,629 | 3/1990 | Shuler, Jr. | 395/622 |
| 4,914,590 | 4/1990 | Loatman et al. | 395/759 |
| 4,922,414 | 5/1990 | Holloway et al. | 395/417 |
| 4,951,225 | 8/1990 | Lee et al. | 395/64 |
| 4,956,791 | 9/1990 | Lee et al. | 395/51 |
| 5,008,786 | 4/1991 | Thatte | 395/489 |
| 5,088,036 | 2/1992 | Ellis et al. | 395/622 |
| 5,109,336 | 4/1992 | Guenther et al. | 395/497.02 |
| 5,146,599 | 9/1992 | Kojima et al. | 395/800 |
| 5,261,088 | 11/1993 | Baird et al. | 395/622 |
| 5,301,287 | 4/1994 | Herrell et al. | 395/412 |
| 5,438,674 | 8/1995 | Keele et al. | 395/404 |

*Primary Examiner*—David L. Robertson
*Attorney, Agent, or Firm*—Limbach & Limbach L.L.P.

[57] ABSTRACT

In controlling data by a computer, pointers are represented by addresses in the real memory space RM in the real memory space RM and by addresses in the virtual memory space IM and by addresses to said real memory space RM in the virtual memory space, and nodes in the virtual memory space IM are indirectly referenced from the nodes in the real memory space RM so that data of a structure in which the nodes are linked by pointers are represented across the real memory space RM and the virtual memory space IM. The data of the structure in which the nodes are linked by the pointers are shifted between the real memory space RM and the virtual memory space IM with the list structures $U_0$, $U_1$, $U_2$, $U_{10}$ employing the link information as units. In this manner, the virtual memory technique may be efficiently realized in the case of the list structure data which are basic and indispensable in the field of symbol manipulation such as artificial intelligence, formula manipulation or natural language manipulation.

2 Claims, 13 Drawing Sheets

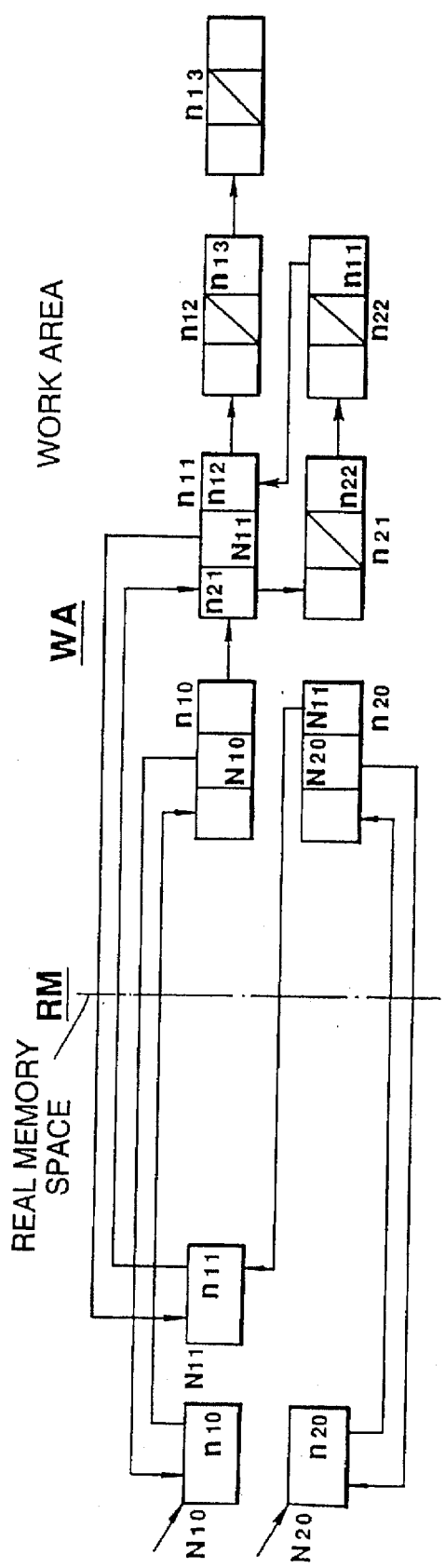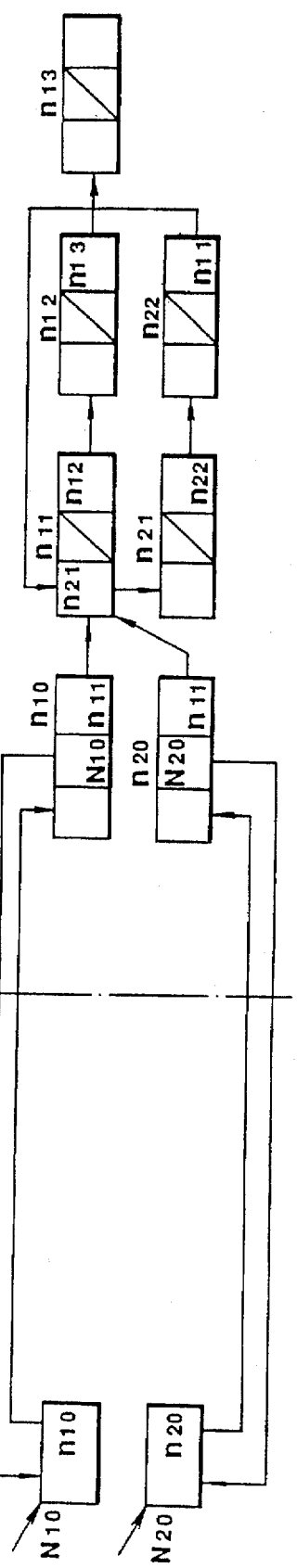
FIG.10E
FIG.10F

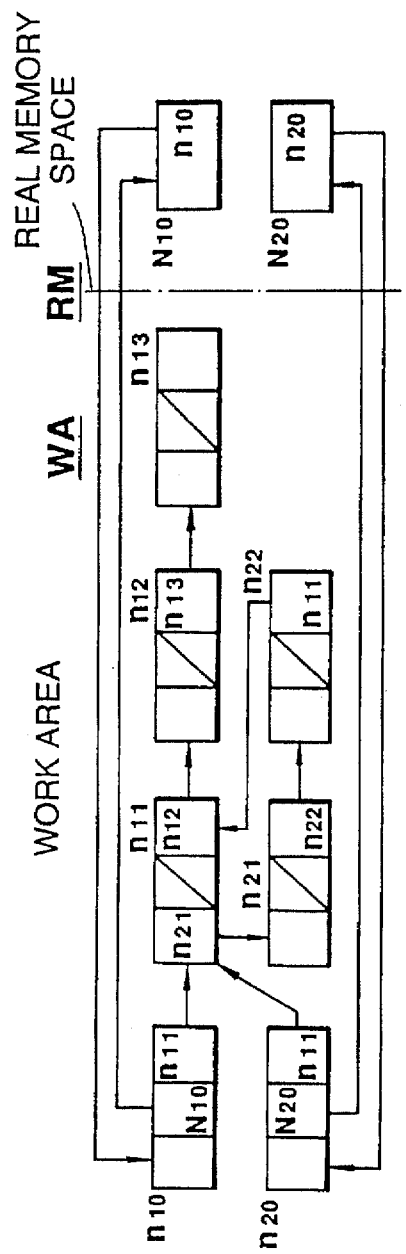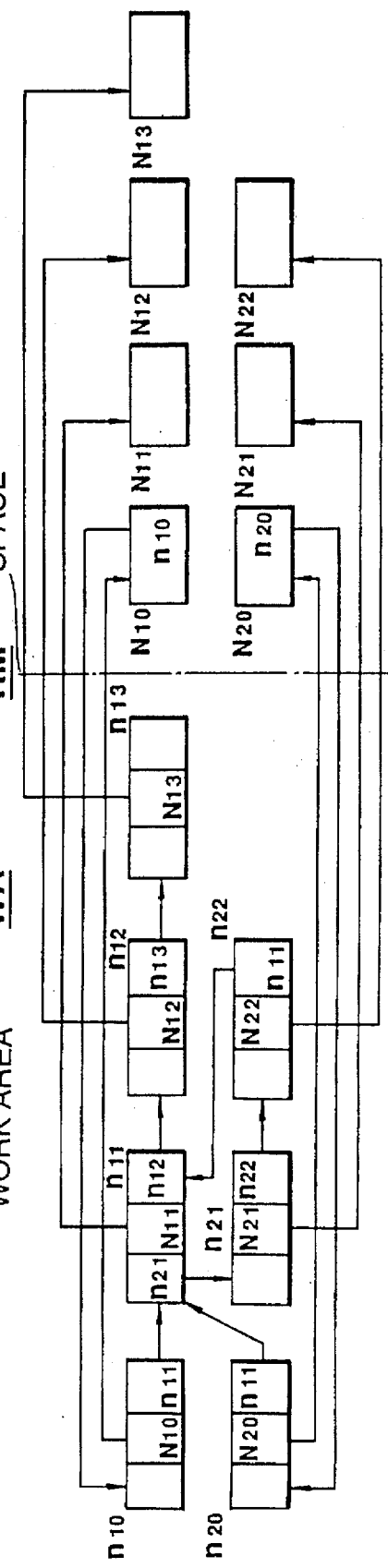
FIG. 13A
FIG. 13B

DATA CONTROL SYSTEM FOR A COMPUTER'S MAIN MEMORY FOR EFFICIENTLY REALIZING VIRTUALIZATION OF LIST STRUCTURE DATA LIVING ACROSS A REAL MEMORY SPACE AND A VIRTUAL MEMORY SPACE

This is a divisional of application Ser. No. 08/117,337, filed Sep. 3, 1993, which is a continuation of Ser. No. 07/548,989(now abandoned) filed as PCT/JP89/01249, Dec. 13, 1989 of Hirotoshi Maegawa et al. for Data Management System.

TECHNICAL FIELD

This invention relates to a main memory data control or management system in a computer and, more particularly, to such a system for efficiently realizing virtualization of list structure data which are basic and indispensable in the field of symbol manipulation, such as artificial intelligence, formula manipulation or natural language manipulation.

BACKGROUND ART

In general, in the field of symbol manipulation, such as artificial intelligence, formula processing or natural language processing, the desired symbolic manipulation is performed under control or management of data items of the list structure in a memory.

Up to now, as the data of the list structure, there known so-called pointer-linked data in which modes are linked together by pointers. With such pointer-linked data, a so-called binary tree structure is most popular, in which each pointer usually acts only in one direction and each node has its own data and pointers, usually two pointers, for referencing to other nodes.

For example, in a LISP language, known as a representative language handling data items of the list structure, an example, of data of the list structure is shown in FIG. 1, in which each of intermediate nodes $N_{10}$, $N_{12}$, $N_{14}$, $N_{15}$, $N_{17}$, $N_{20}$, $N_{22}$, $N_{24}$ and $N_{26}$ has two pointers, while concrete data all carried by terminal nodes $N_{11}$, $N_{13}$, $N_{16}$, $N_{18}$, $N_{19}$, $N_{21}$, $N_{23}$, $N_{25}$, $N_{27}$ and $N_{28}$, with the information being curried by the state of construction of the terminal nodes.

For handling the data of the list structure in a memory, the nodes $N_{10}$, $N_{11}$, $N_{12}$, $N_{13}$, ... are represented in a memory space M provided with addresses, and the pointers are indicated by the addresses in the memory space M, as shown for example in FIG. 2, for computerized control of the above data.

Meanwhile, the data of the list structure handled in the field of symbol manipulation may be jointed together, disconnected, expanded or contracted and thus present a dynamic structure and a trial-and-error type behavior in which the information given as the data structure is changed multifariously.

Also, when such data of the list structure is controlled in the memory by a computer, the data structure becomes scattered on the memory which new nodes on the memory may be lost or used-up)unnecessary data may be produced. These unnecessary nodes are recovered and re-used as new nodes by way of a garvage collection.

In case of shortage of the real memory space despite such garbage collection, the memory space M may be expanded by application of a virtual memory technique, that is by virtuatization. For example, as shown in FIGS. 3 and 4, the memory space is controlled or managed on the page-by-page basis, and thus a page-by-page data swapping is performed between the real memory space RM and the virtual or virtual memory space IM.

It will be noted that the current computer architecture is designed to process local data having a static structure and is not suited to manipulation of the data of the list structure used in the field of symbol manipulation. Thus an extremely long time interval is necessitated in executing the garbage collection in which the object of manipulation is scattered dynamically. On the other hand, for virtualizing the memory space, it has been customary to control the memory space on the page-by-page basis on the premises that the related data are at the near-by locations. While the page represents a fixed area in the memory space, since the data of the list structure are changed dynamically, the structure is caused to lie across a plurality of pages in an intricate manner thus resulting in frequent occurrences of page falults and a lowered efficiency. Above all, when garbage collection is performed with respect to the virtualized memory space, since the page-by-page data swapping is executed between the real memory space and the virtual memory space, the operational efficiency is lowered significantly.

In view of the above described status of the art, it is an object of the present invention to provide for efficient virtual strage of data of the list structure which are fundamental and indispensable in the field of symbol manipulation such as artificial intelligence, formula manipulation or natural language manipulation.

DISCLOSURE OF THE INVENTION

For accomplishing the above object. the present invention provides a data control system characterized in that, in a real memory space, pointers are represented by addresses in the real memory space, and by addresses in the virtual memory space and addresses to said real memory space in the virtual memory space, nodes on the virtual memory space are indirectly referenced from nodes on said real memory space, so that data of a structure in which the near-by nodes are linked by the pointers are represented across the real memory space and the virtual memory space, and in that the data of the structure in which the near-by modes are linked by the pointers are shifted between the real memory space and the virtual memory space with the list structures employing the link information as units.

With the data control system of the present invention, data of a structure in which the nodes are linked together by pointers are represented in both a real memory space and a virtual memory space by indicating the pointers in the real memory space by the addresses in the real memory space and the pointers in the virtual memory space by the addresses in the virtual memory space and by the addresses to said real memory space, and by indirect referencing from the nodes in the real memory space to the nodes in the virtual memory space this obviates the necessity of expressing the whole memory space by pointers. On the other hand, by shifting the data having the nodes linked together by the pointers between the actual memory space and the virtual memory space with the list structure employing the link information as the unit, data control or management may be achieved without the necessity of statically dividing the dynamic data and with the dynamic data structure remaining intact.

BRIEF DESCRIPTION OF THE DRAWINGS

FIGS. 10A, 10B, 10C, 10D, 10E and 10F are diagrams for illustrating the operational sequence of listing out of the list structure unit shown in FIG. 9 from the real memory space into the virtual memory space;

BEST EMBODIMENT FOR PRACTICING THE INVENTION

Figure 1:
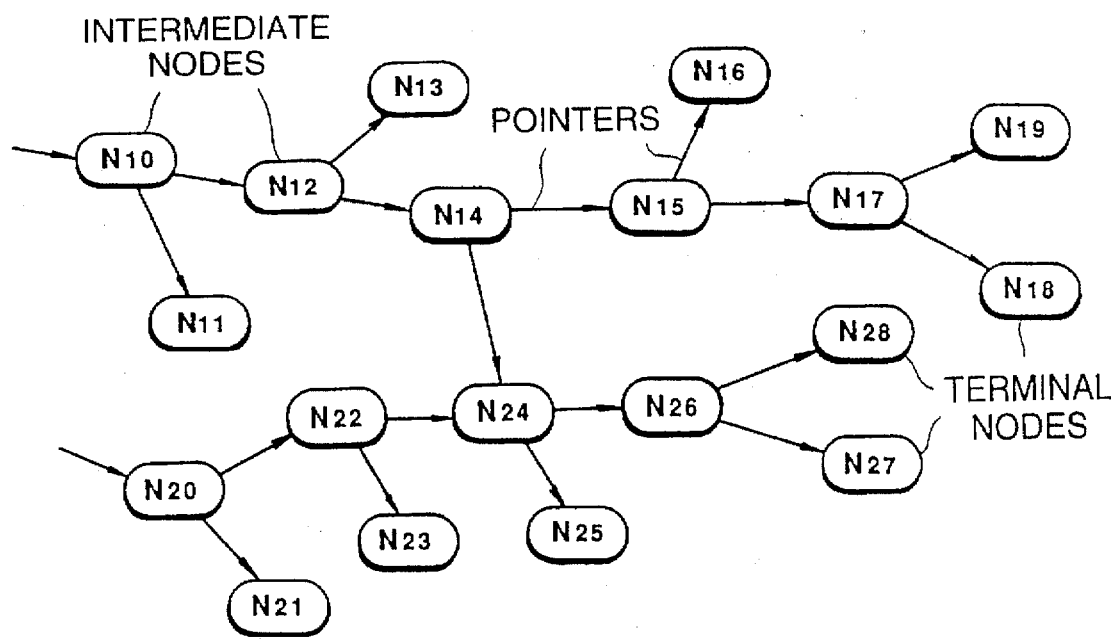
FIG. 1 is a diagram showing an example of data of a list structure in general.
Figure 2:
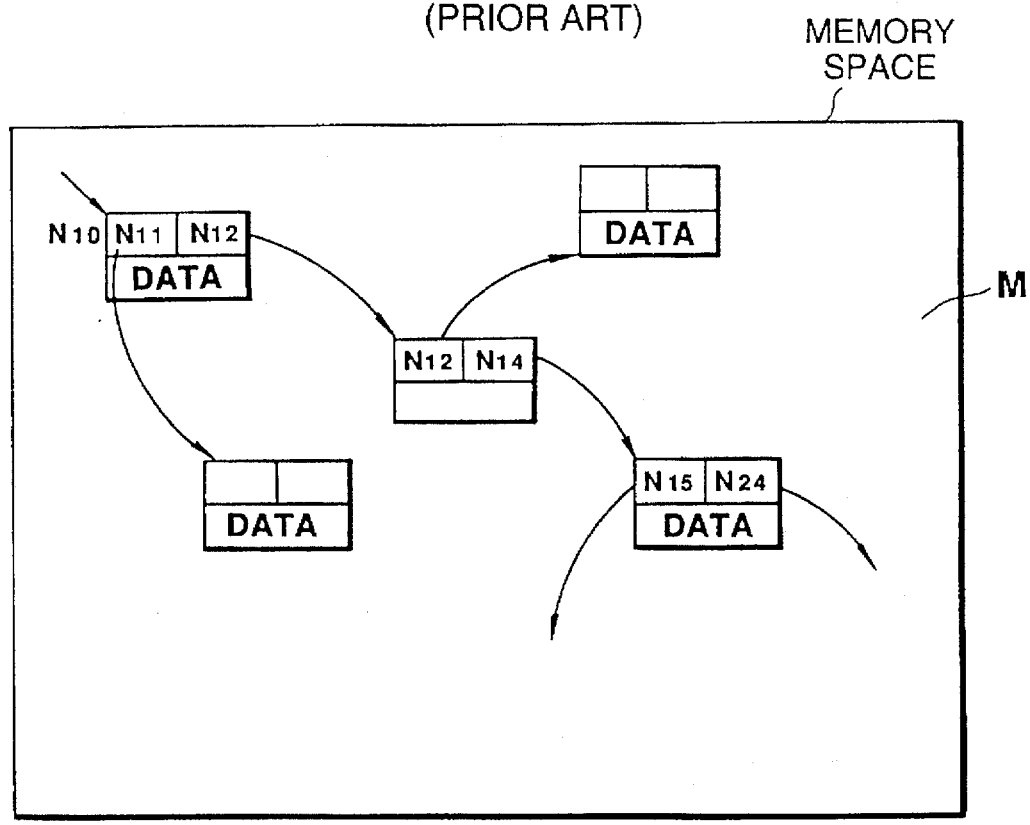
FIG. 2 is a diagram showing the data of the list structure in a memory space.
Figure 3:
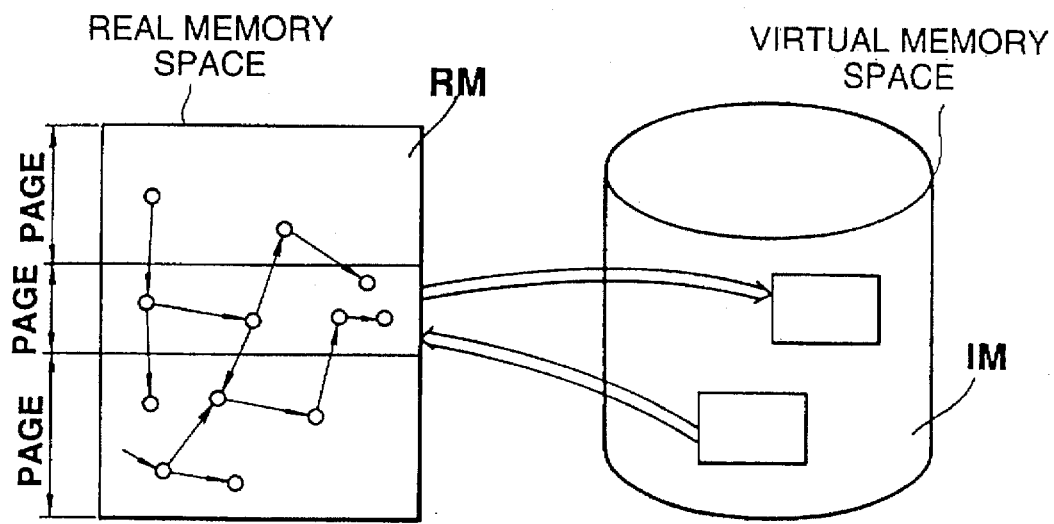
FIGS. 3 and 4 are diagrams showing an example of a memory space expanded by application of a conventional technique of a virtual memory.
Figure 4:
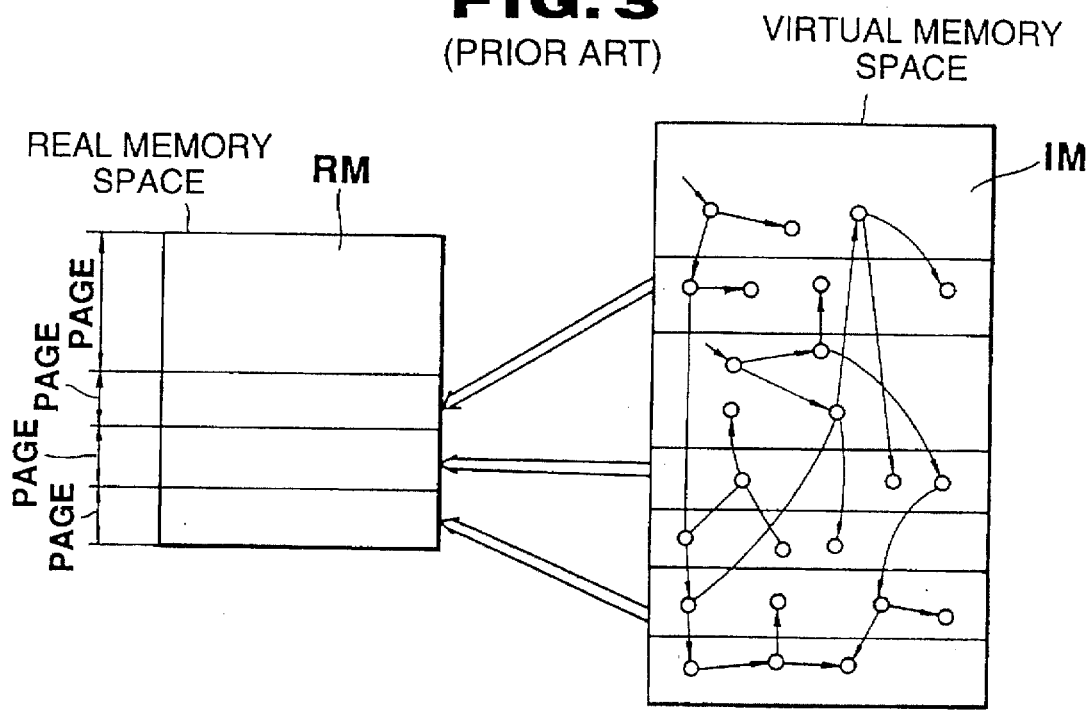

An embodiment of the present invention will be hereinafter explained by referring to the drawings.

Figure 5:
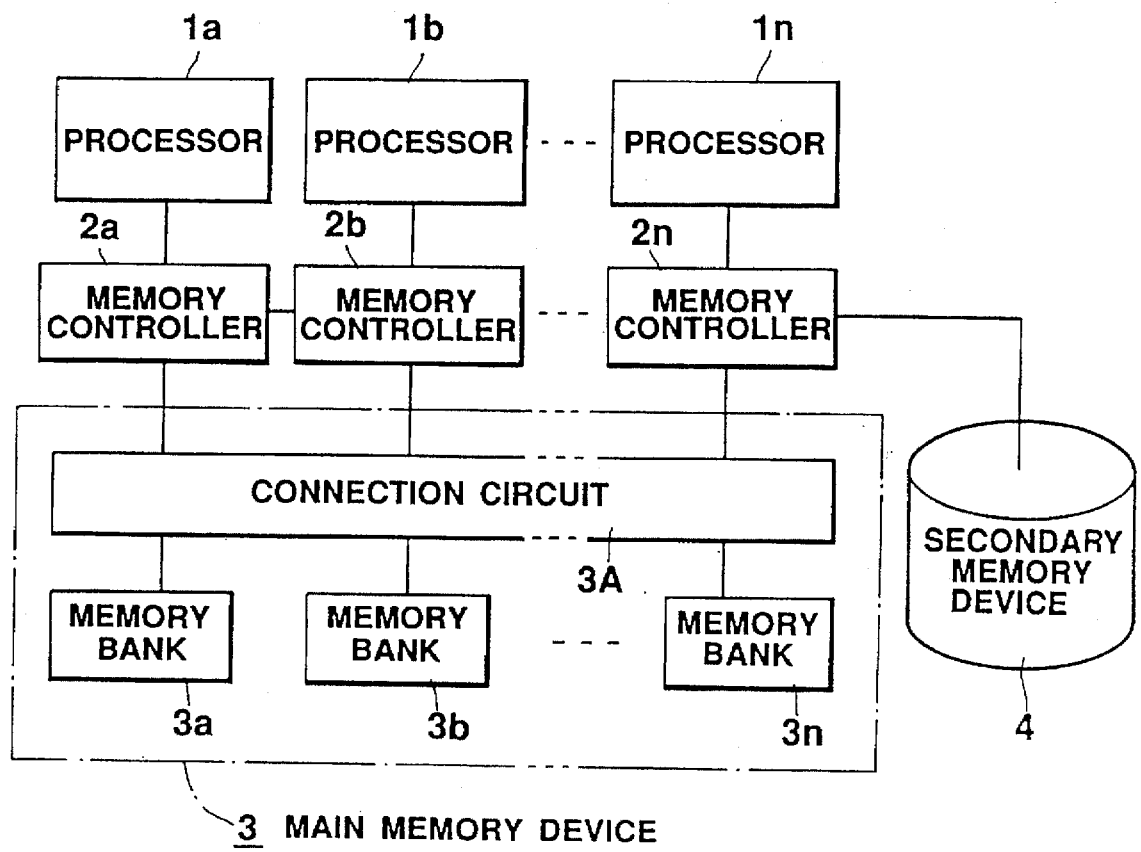
FIG. 5 is a block diagram showing the organization of a multiprocessor system to which the present invention is applied.

FIG. 5 is a block diagram showing a conceptual construction of a multiprocessor system for handling list type data under application of the data supervisory system of the present invention. This multiprocessor system is constituted by a main memory device 3 forming a real memory space accessed by a plurality of processors $1a$, $1b$, ..., $1n$ by way of memory controllers $2a$, $2b$, ..., $2n$ and a secondary memory device 4, such as a hard disk device, forming a virtual memory space, for increasing the storage capacity by application of the virtual memory technique.

Meanwhile, the main memory device 3 is constituted by a plurality of memory banks $3a$, $3b$, ..., $3n$ and a connection circuit 3A for these memory banks $3a$, $3b$, ..., $3n$.

Figure 6:
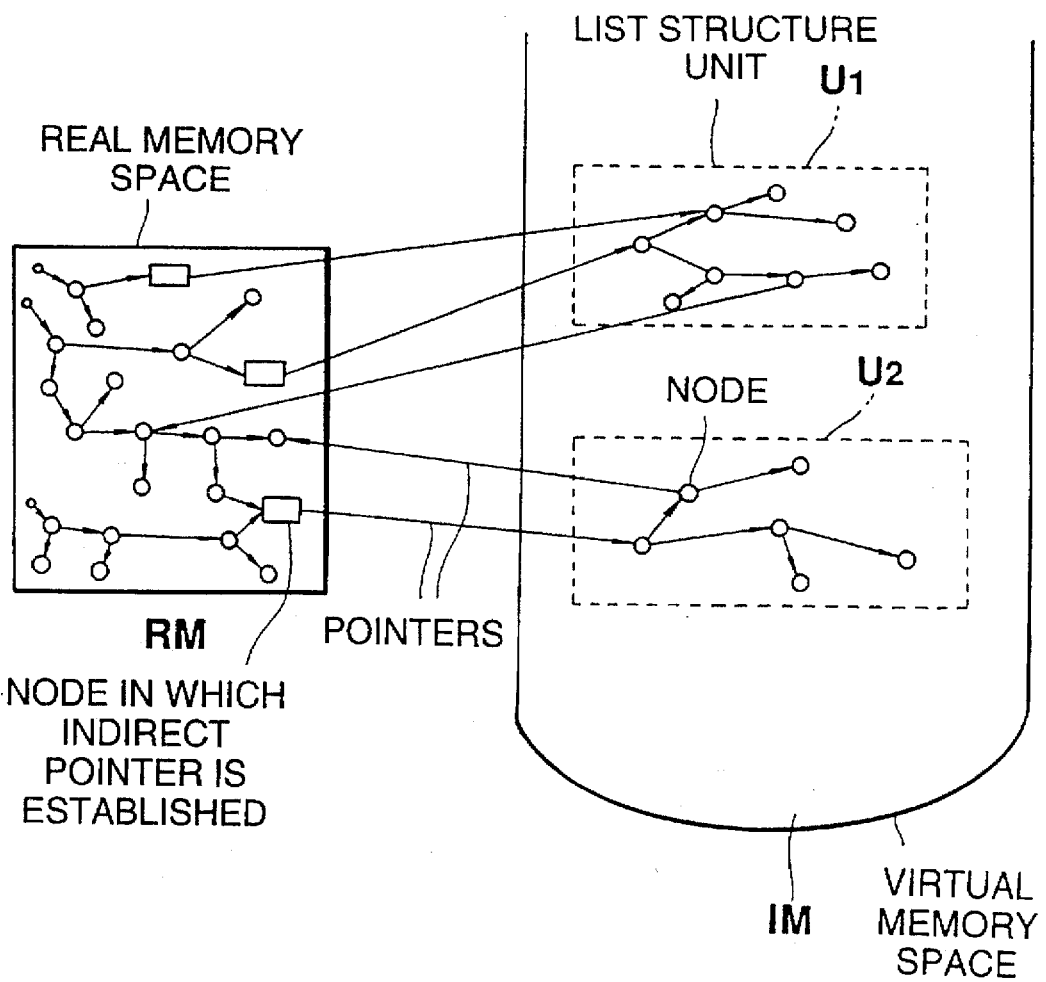
FIG. 6 is a diagram showing an example of data of the list structure handled in the processor system to which the present invention is applied, and which are represented in both the real memory space and the virtual memory space.

The list structure data handled by the present multiprocessor system are represented as the list structure data lying across a real memory space RM by the main memory device 3 and a virtual memory space IM by the secondary memory device 4 and having the nodes linked by pointers, as shown in FIG. 6, in which the pointers in the real memory space are represented by the addresses in the real memory space, the pointers in the virtual memory space are represented by addresses in the virtual memory space and by addresses to the real memory space and the nodes in the virtual memory space are referenced from the nodes in the real memory space by indirect pointers. The list structure data are swapped between the real memory space RM and the virtual memory space IM in the form of list structure units $U_1$, $U_2$ shown within broken line rectangles in FIG. 6.

Meanwhile, the nodes in the real memory space in which the indirect pointer for referencing to the node in the virtual memory space is established are indicated by rectangle marks, while the remaining nodes are indicated by circle marks.

The concrete expressional examples of the list structure data will be hereinafter explained.

Figure 7:
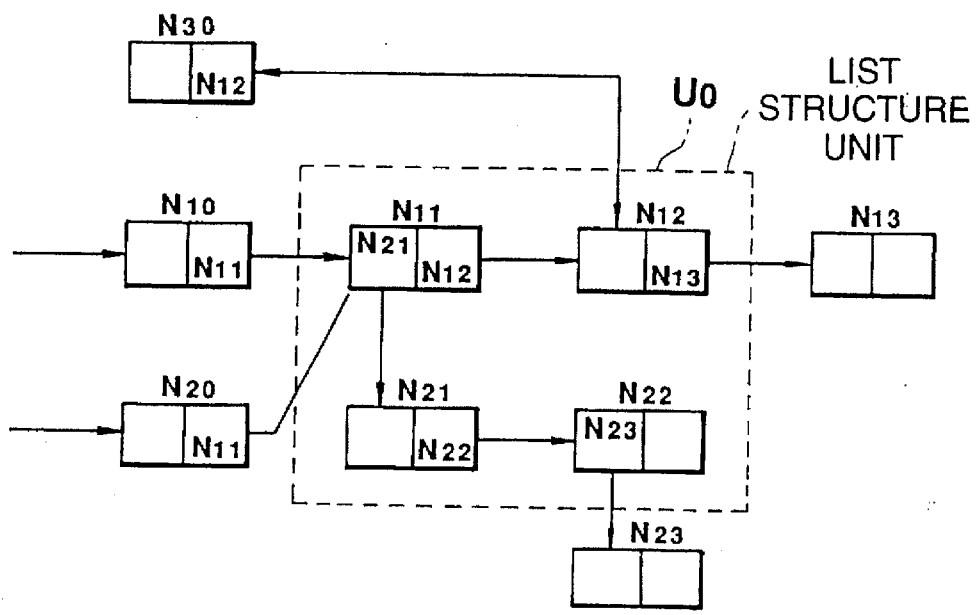
FIG. 7 is a diagram showing a concrete example of data of the list structure represented in the real memory space.
Figure 8:
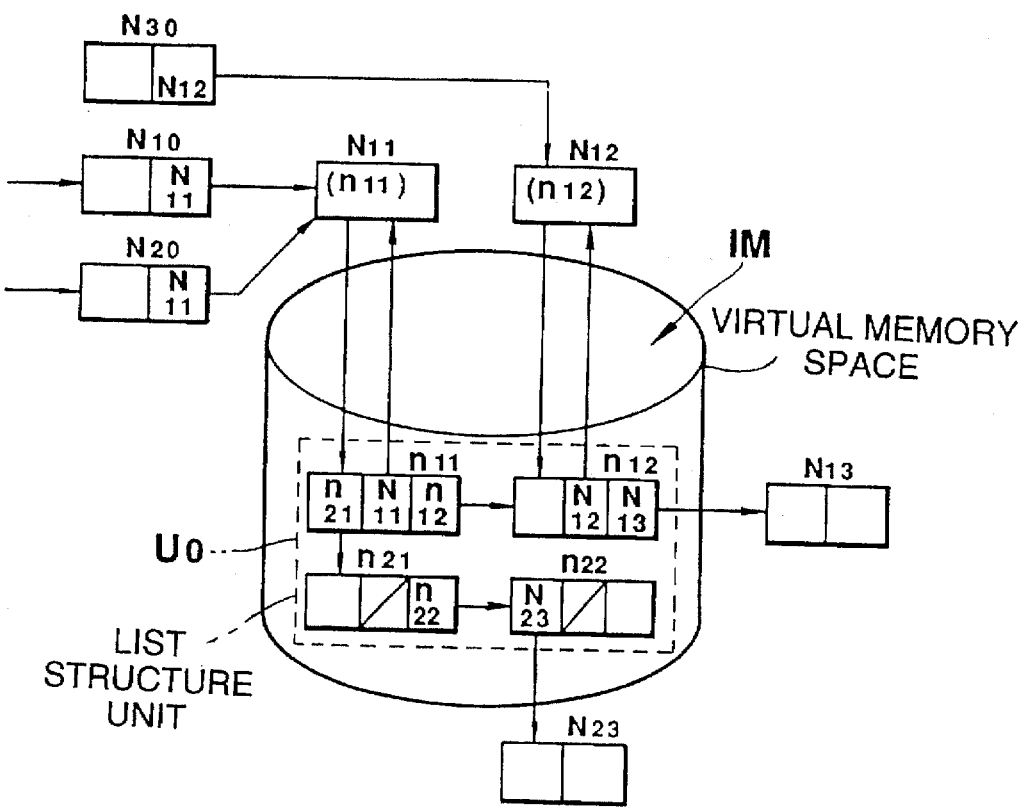
FIG. 8 is a diagram showing a concrete example of the data of the list structure shown in FIG. 7, respected in both the real memory space and the virtual memory space.

For example, the list structure data in which, as shown in FIG. 7, nine nodes $N_{10}$, $N_{11}$, $N_{12}$, $N_{13}$, $N_{20}$, $N_{21}$, $N_{22}$, $N_{23}$ and $N_{30}$, represented in the real memory space RM by the main memory 3, are linked together by real memory space addresses in the real memory space RM, may be represented as shown in FIG. 8 when the list structure unit $U_0$ constituted by the four nodes $N_{11}$, $N_{12}$, $N_{21}$ and $N_{22}$ shown within a broken line rectangle in FIG. 7 is moved into the virtual memory space IM by the auxiliary memory device 4.

Referring to FIG. 8, four nodes $n_{11}$, $n_{12}$, $n_{21}$ and $n_{22}$ constituting the above mentioned list structure unit $U_0$, thus moved into the virtual memory space IM, are linked by the virtual memory space addresses of the nodes $n_{21}$ and $n_{22}$ in the virtual memory space IM and the pointers directly indicating the real memory space addresses of the nodes $N_{11}$, $N_{12}$, $N_{13}$, AND $N_{23}$ in the real memory space RM, with these nodes $n_{21}$, $n_{22}$, $N_{11}$, $N_{12}$, $N_{13}$ and $N_{23}$. On the other hand, the nodes $N_{11}$ and $N_{12}$ in the real memory space RM are linked, by indirect pointers indicating the virtual memory space addresses of the nodes $n_{11}$, $n_{12}$ of the list structure unit $U_0$ in the virtual memory space IM, with these nodes $n_{11\ and\ n12}$.

With the present system, handling the data of the above described list structure, if there are no necessary nodes in the above mentioned real memory space (RM) in the course of the dynamic changes of the list data, list faults are produced, and the nodes are in the above mentioned virtual memory space (IM), the data of a series of units of the list structure, inclusive of the nodes, are swapped from the virtual memory space IM into the real memory space (RM) by way of a list-in operation in accordance with a procedure which will be described subsequently.

Also, with the present system, the number of the free nodes in the real memory space RM is monitored and, when the free nodes in the real memory space has become depleted, unnecessary nodes are recovered as free nodes by way of a garbage collecting operation. When the number of the free nodes exceeds a predetermined thresholed value Sh as a result of this garbage collection, the operation reverts to the data processing per se. When the number of the free nodes does not exceed the predetermined threshold value Sh as a result of the garbage collection, pointers to the unnecessary list data are extracted at this time in the real memory space RM, and a list-out operation is performed in the real memory space RM for swapping out data of the list structure units from the real memory space RM to the virtual memory space IM. When the number of data of the list structure units listed out in the real memory space RM is small and lesser than the predetermined threshold Ss, pointers to the unnecessary list data are listed out in the real memory space RM to repeatedly perform listing out of new list data in the real memory space RM. When the number of data of the list structure units listed out in the real memory space RM reaches the threshold value Ss, the data of the list structure units listed out in the real memory space RM are swapped out from the real memory space RM into the virtual memory space IM to terminate the listing-out operation to revert to data processing per se.

The listing-out operation from the real memory space RM to the virtual memory space IM is performed in the following manner with the use of indirect pointers by sweeping the list structures and by referencing to the number of the links of each node by a reference counter.

Figure 9:
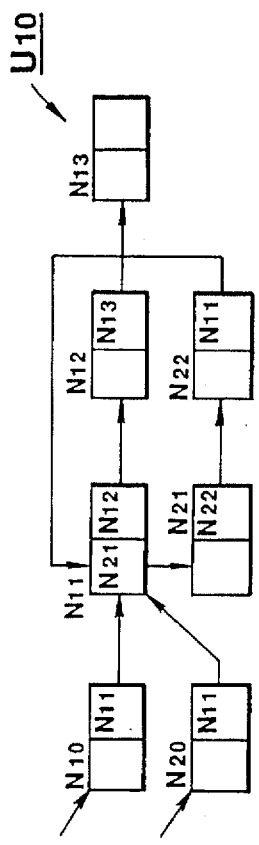
FIG. 9 is a diagram showing a constructional example of a list structure unit for listing out from the real memory space into the virtual memory space.

An explanation is made of the case in which, as shown in FIG. 9, a unit of the list structure $U_{10}$ in which seven nodes $N_{10}$, $N_{11}$, $N_{12}$, $N_{13}$, $N_{20}$, $N_{21}$ and $N_{22}$ in the real memory space RM are interconnected by pointers is listed out from the real memory space RM into the virtual memory space IM. First of all, in the real memory space RM, the list structure unit $U_{10}$ is listed out on a work area WA of the real memory space RM in accordance with a procedure shown in FIG. 10A to FIG. 10F.

Figure 10A:
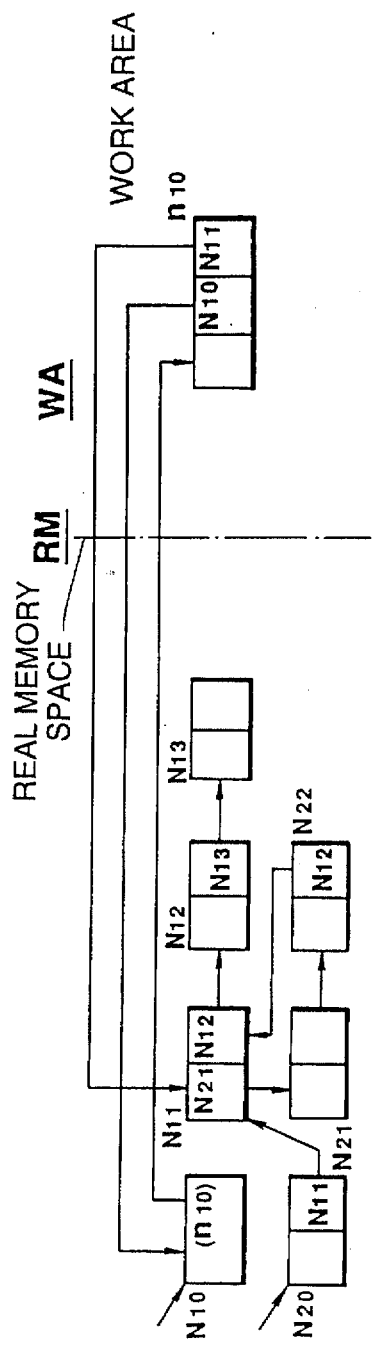

First, attention is directed to a node at the start position of the list structure unit U10 in the real memory space RM and, as shown in FIG. 10A, a node $n_{10}$ having a reverse reference pointer indicating a link to the node $N_{10}$ by a real memory space address and a reverse reference pointer indicating a link to a node $N_{11}$ linked by the pointer of the node $N_{10}$ by a real memory space address is provided in the work area WA of the real memory space RM, as the node for transfer to the virtual memory space IM, while an indirect pointer indicating a link to the node $n_{10}$ for transfer to the virtual memory space IM is provided at the node $N_{10}$ in the real space memory RM.

Figure 10B:
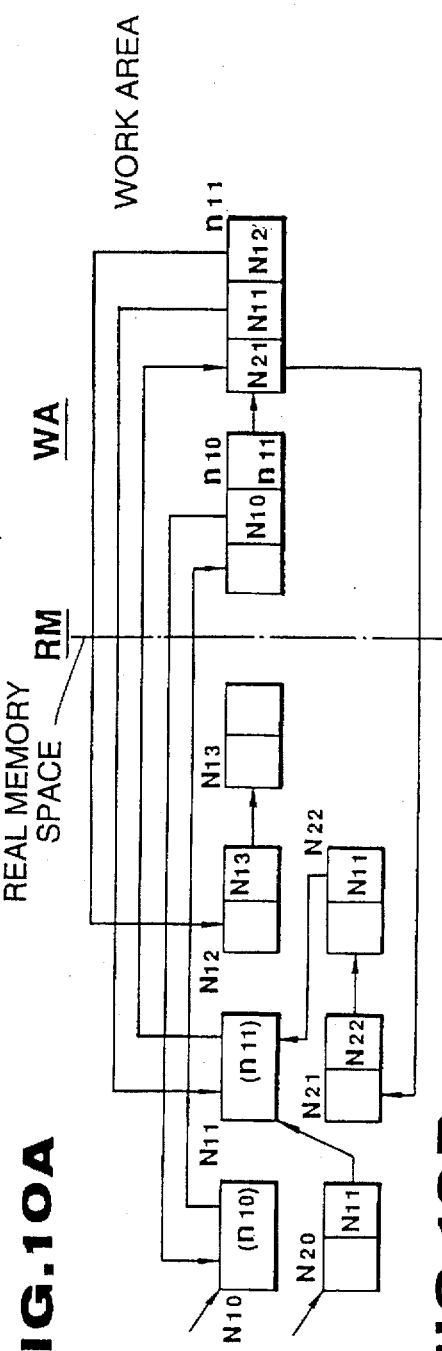
Figure 10C:
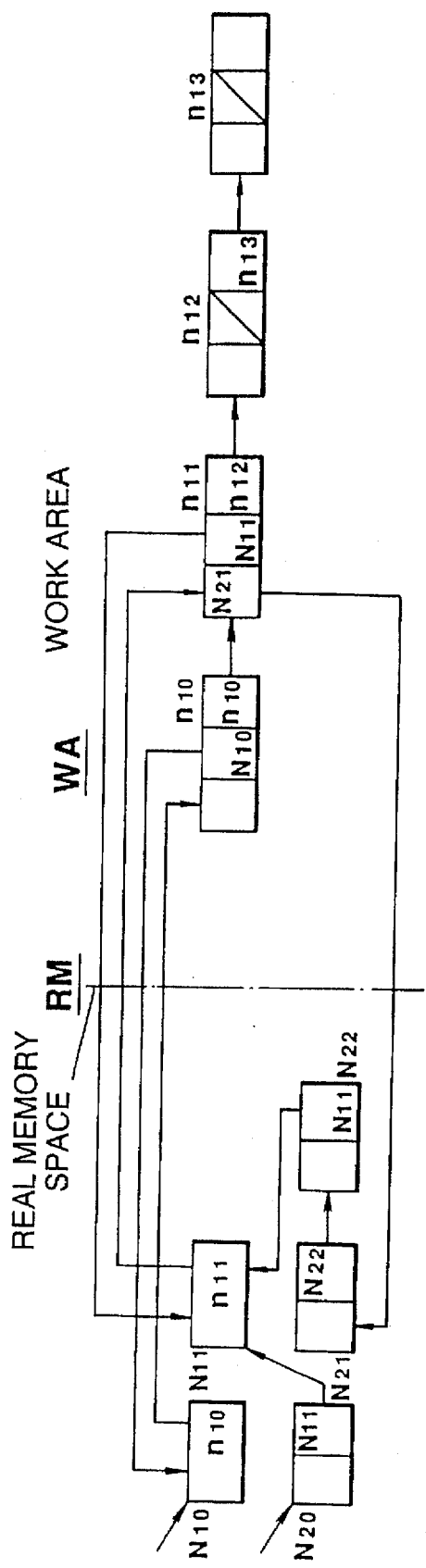
Figure 10D:
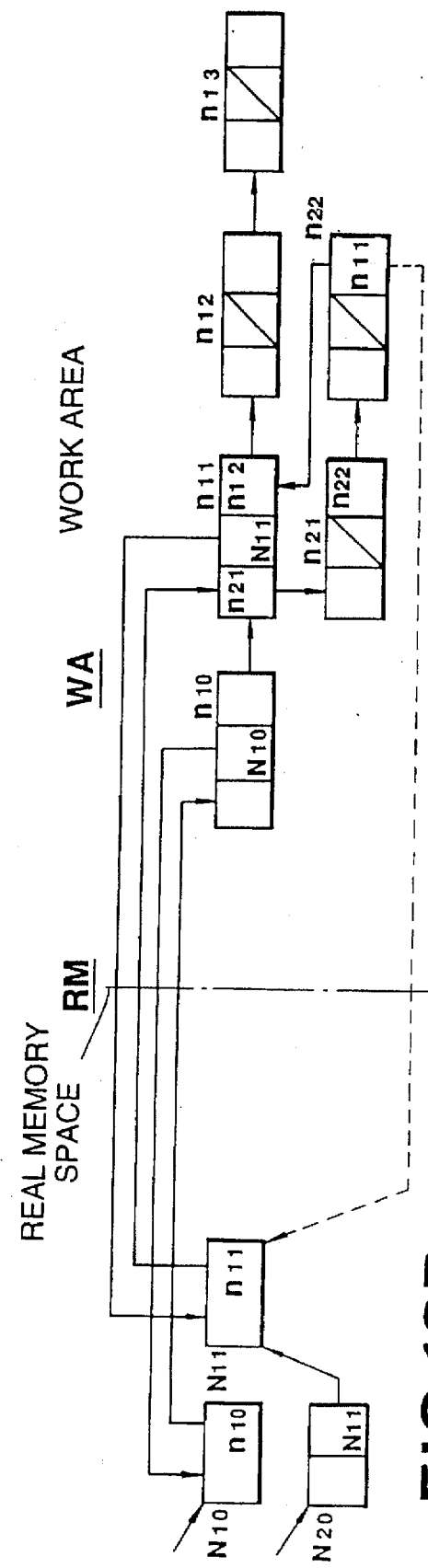

Then, attention is directed to the node $N_{11}$ linked to the node $U_{10}$ in the real memory space RM and, as shown in FIG. 10B, a node $n_{11}$ having a reverse reference pointer indicating a link to the node $N_{11}$ by a real memory space address and reverse reference pointers indicating links to the nodes $N_{12}$, $N_{21}$ linked by the pointer of the node $N_{11}$ by real memory space addresses is provided on the work area WA. The indirect pointer indicating the link to the node $n_{11}$ of the work area WA is established in the node $N_{11}$, while the link to the node $N_{12}$ in the real memory space RM by the pointer $n_{10}$ of the work area WA is transferred to the link to the aforementioned node $n_{12}$ of the work area WA corresponding to the aforementioned node $N_{12}$, and the reverse reference pointer to the node $N_{12}$ is changed to a pointer representing the link to the node $n_{11}$ by the virtual memory space address.

Attention is then directed to the node $N_{21}$ in the real memory space RM linked by the reverse reference pointer of the node $n_{11}$ of the work area WA and, by tracing the link to the node $N_{22}$ by the pointer of the node $N_{21}$, the nodes $N_{21}$, $N_{22}$ in the real memory space RM are transferred to the work area WA to establish the node $n_{21}$ linked by the pointer of the node $n_{11}$ and the node $n_{22}$ linked by the pointer of the node $n_{22}$ in the work area WA. In addition, the link to the node $N_{11}$ in the real memory space RM by the reverse reference pointer of the aforementioned node $n_{22}$ of the work area WA is exchanged for a link to the aforementioned node n11 of the work area WA corresponding to the aforementioned node $N_{11}$.

With attention then being directed to an unswept node $N_{20}$ at the other start position of the list structure unit $U_{10}$ in the real memory space RM, a node $n_{20}$ having a reverse reference pointer representing the link to the node $N_{20}$ by the real memory space address and the reverse reference pointer indicating the link to the node N11 linked by the pointer of the aforementioned node $N_{20}$ by the real memory space address is provided in the work area WA, while the indirect pointer indicating the link to the node $n_{20}$ is established in the node $N_{20}$ in the real memory space RM.

Figure 11:
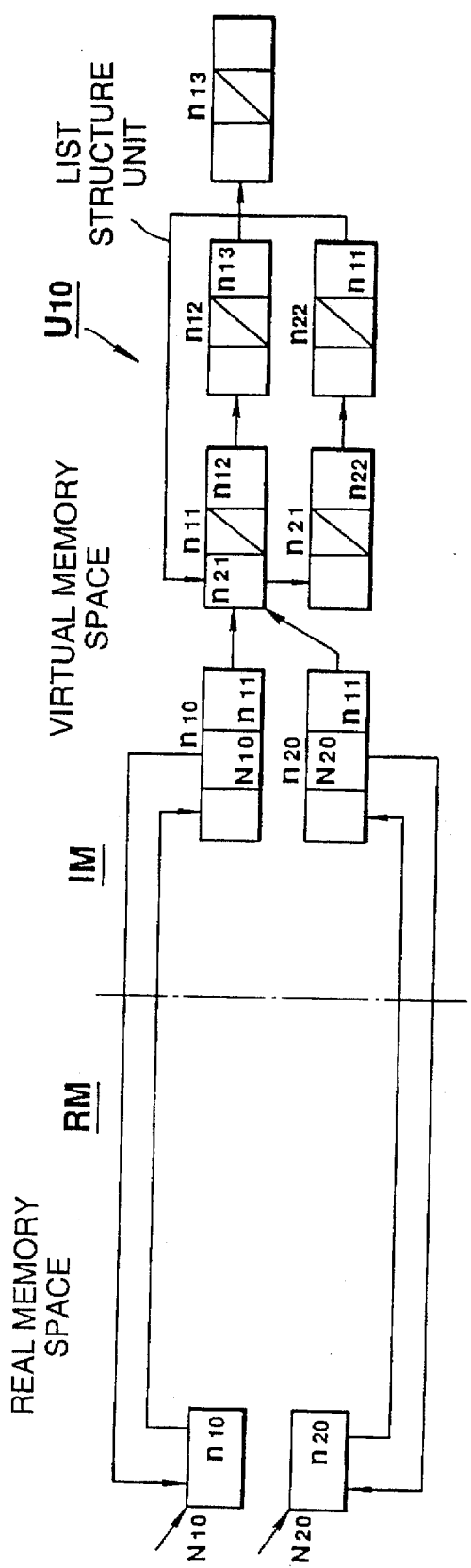
FIG. 11 is a diagram showing the state of listing out of the list structure unit shown in FIG. 9 from the real memory space into the virtual memory space.

The link to the node $N_{11}$ in the real memory space RM by the reverse reference pointer of the node $n_{20}$ of the work area WA is exchanged for the link to the node $n_{11}$ of the work area WA corresponding to the node $N_{11}$ shift the node $N_{11}$ in the real memory space RM to the node $n_{11}$ of the work area WA completely as shown in FIG. 10F to terminate listing-out of the list structure unit $U_{10}$ into the work area WA in the real memory space RM, Ultimately, by swapping out data of the list structure unit $U_{10}$ from the work area WA in the real memory space RM by the main memory 3 to the virtual memory space IM by the secondary memory 4, the list structure unit $U_{10}$ is listed out to the virtual memory space IM as shown in FIG. 11.

Thus, with the use of the indirect pointer, the cyclic list structure such as the aforementioned list structure unit $U_{10}$ may be listed out successfully and, by the swapping out the data of the list structure unit listed out in the real memory space RM by the main memory 3 from the real memory space RM to the virtual memory space IM by the secondary memory 4, listing out to the virtual memory space IM may be accomplished efficiently and promptly.

Meanwhile, the usual pointers directly indicating the links in the memory spaces, that is indicating the link to the node in the real memory space RM by the real memory space address and indicating the link to the node in the virtual memory space IM by the virtual memory space address, may be distinguished from the indirect pointers of the nodes $N_{11}$, $N_{12}$ in the real memory space RM indicating the virtual memory space addresses of the nodes in the virtual memory space IM or the reverse reference pointers of the nodes $n_{10}$, $n_{11}$ in the virtual memory space IM indicating the links to the nodes on the real memory space RM by the real memory space address, from the contents of a tag which is annexed to the pointer and which indicates the kind of the node indicated by the pointer.

Next, when the node desired to be accessed is not in the real memory space RM, but is a node in the virtual memory space IM, indicated by the indirect pointer, the listing-in from the virtual memory space IM by the secondary memory 4 to the real memory space RM by the main memory 3 is performed in the following manner.

Figure 12:
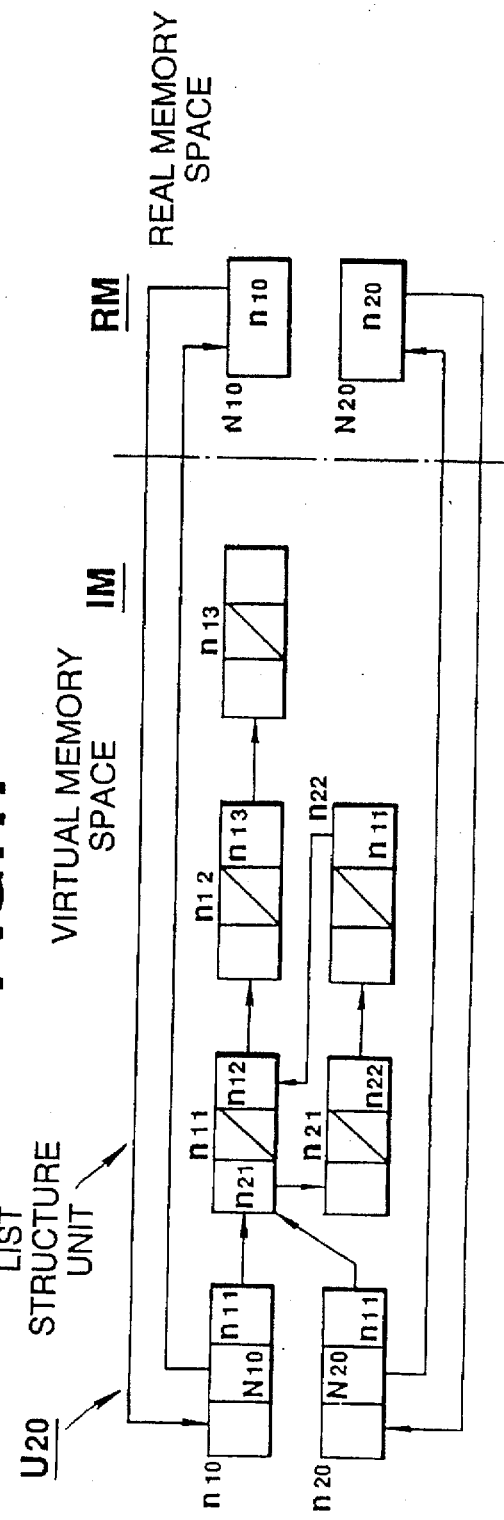
FIG. 12 is a diagram showing a constructional example of a list structure unit for listing-in from the virtual memory space into the virtual memory space.

The explanation is made of the case in which, as shown in FIG. 12, the list structure unit $U_{20}$ by the nodes $n_{10}$, $n_{11}$, $n_{12}$, $n_{13}$, $n_{20}$, $n_{21}$ and $n_{22}$ in the virtual memory space IM, linked by the indirect pointers of the nodes $N_{10}$, $N_{11}$ in the real memory space RM. In this case, the data of the list structure unit $U_{20}$ are swapped to the work area WA in the real memory space RM and, in the real memory space RM, listing-in of the list structure unit $U_{20}$ from the work area WA is performed in accordance with a procedure shown in FIGS. 13A to 13D.

That is, the list structure unit U20 of the above mentioned work area WA, shown in FIG. 13A, swapped from the virtual memory space IM to the real memory area RM, is swept, while, as shown in FIG. 13B, reverse reference pointers are established in the nodes $n_{11}$, $n_{12}$, $n_{13}$, $n_{21}$ and $n_{22}$, constituting the list structure unit $U_{20}$, and the nodes $N_{11}$, $N_{12}$, $N_{13}$, $N_{21}$ and $N_{22}$ are provided in the real memory space RM.

Figure 13C:
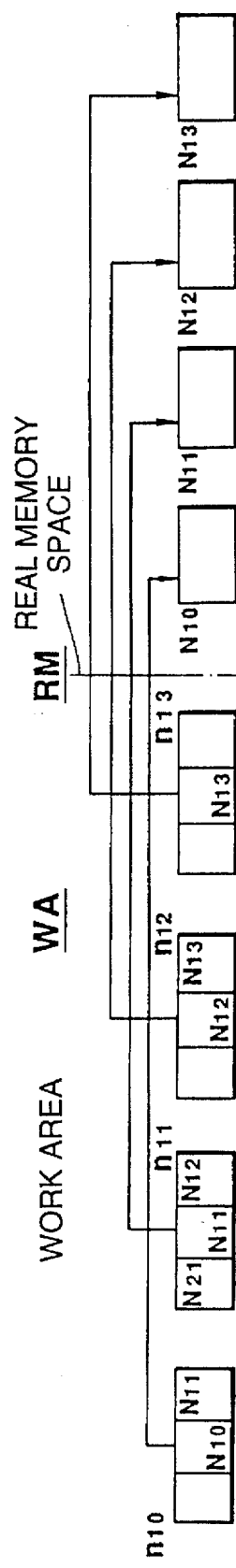
FIGS. 13A, 13B, 13C and 13D are diagrams for illustrating the operational sequence of the list-in operation in the real memory space for listing-in the list structure unit shown in FIG. 12 from the virtual memory space into the real memory space.

The list structure unit $U_{20}$ is again swept and, as shown in FIG. 13C, the pointers represented by the virtual memory space addresses of the nodes $n_{10}$, $n_{11}$, $n_{12}$, $n_{13}$, $n_{20}$, $n_{21}$ and $n_{22}$ constituting the above mentioned list structure unit $U_{20}$ of the work area WA are exchanged for reverse reference pointers by the real memory space addresses for linking to the nodes, $N_{11}$, $N_{12}$, $N_{13}$, $N_{21}$, and $N_{22}$ in the real memory space RM.

Figure 13D:
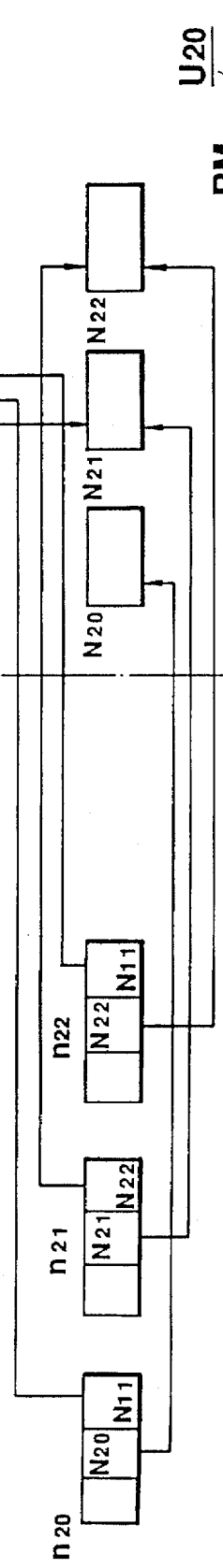
Figure 13E:
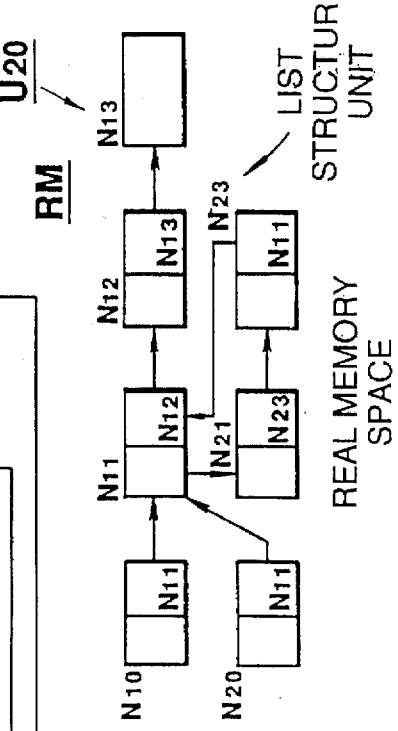

The list structure unit $U_{20}$ is then swept a third time and, as shown in FIG. 13D, the contents of the nodes $n_{10}$, $n_{11}$, $n_{12}$, $n_{13}$, $n_{20}$, $n_{21}$ and $n_{22}$ constituting the list structure unit $U_{20}$ of the work area WA are transferred to the nodes $N_{10}$, $N_{11}$, $N_{12}$, $N_{13}$, $N_{20}$, $N_{21}$ and $N_{22}$ in the real memory space RM to transfer the list structure unit $U_{20}$ in its entirety from the work area WA to the real memory space RM to terminate listing-in of the list structure unit $U_{20}$ from the virtual memory space IM by the secondary memory area 4 to the real memory space RM by the main memory 3.

The listing-in from the virtual memory space IM to the real memory space RM may be achieved by a method similar to that of listing out from the real memory space RM to the virtual memory space IM.

Figure 14:
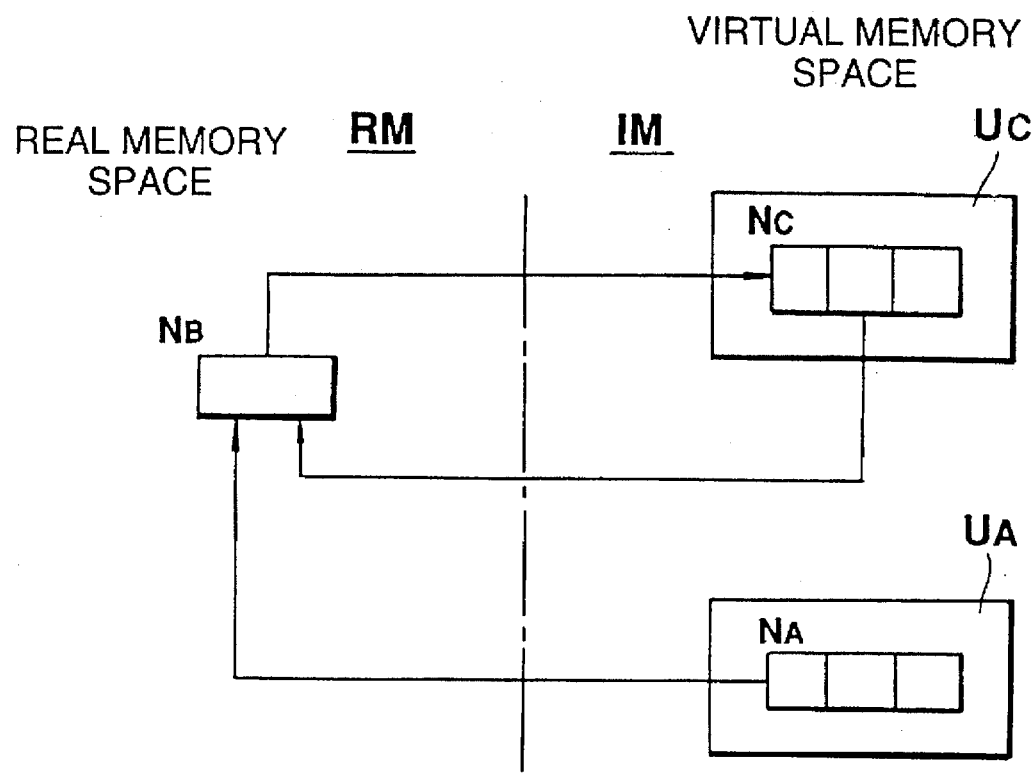
FIG. 14 is a diagram showing a list structure with a remnant indirect pointer in the real memory space as a result of listing-out.
Figure 15:
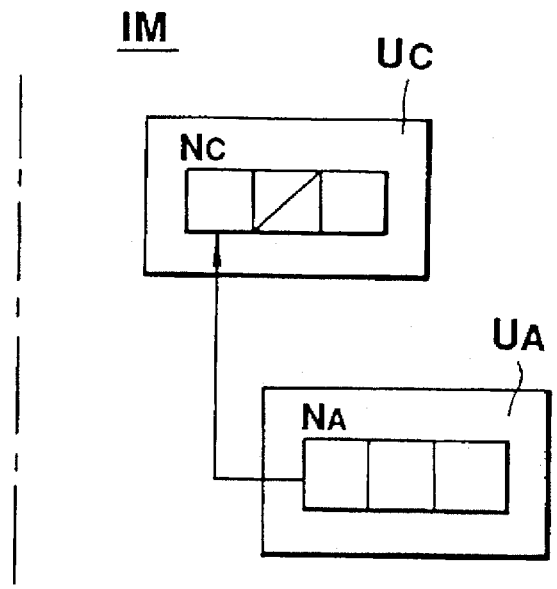
FIG. 15 is a schematic showing a list structure in which the indirect pointer shown in FIG. 14 has been deleted.

Meanwhile, when the real memory space RM by the main memory 3 is enlarged in processing by the virtual memory space IM by the secondary memory, referencing from the node of the list structure unit listed out in the virtual memory space IM to the node in the real memory space RM occurs frequently. For example, as shown in FIG. 14, it may occur that the node $N_B$ in the real memory space RM referenced from the node $N_A$ of the list structure unit $U_A$ in the virtual memory space IM is not referenced from any other nodes in the real memory space RM but turns out to be an indirect pointer to the node $N_C$ of the list structure unit $U_C$ in the virtual memory space IM. In such case, referencing to the mode $N_B$ in the real memory space RM from the virtual memory space IM may be rewritten to delete the indirect pointer to increase the number of free nodes in the real memory space, as shown in FIG. 15.

The above mentioned sequence of operations for deleting the indirect pointers may be realized, as a principle, by preparing a reverse reference table to each indirect pointer and by rewriting the referencing to the corresponding indirect pointer in the listed-out list structure unit at the listing-out time. Since this procedure contains operations of handling list structures in the virtual memory space, the amount of accessing to the virtual memory space with long accessing time is increased.

Figure 16A:
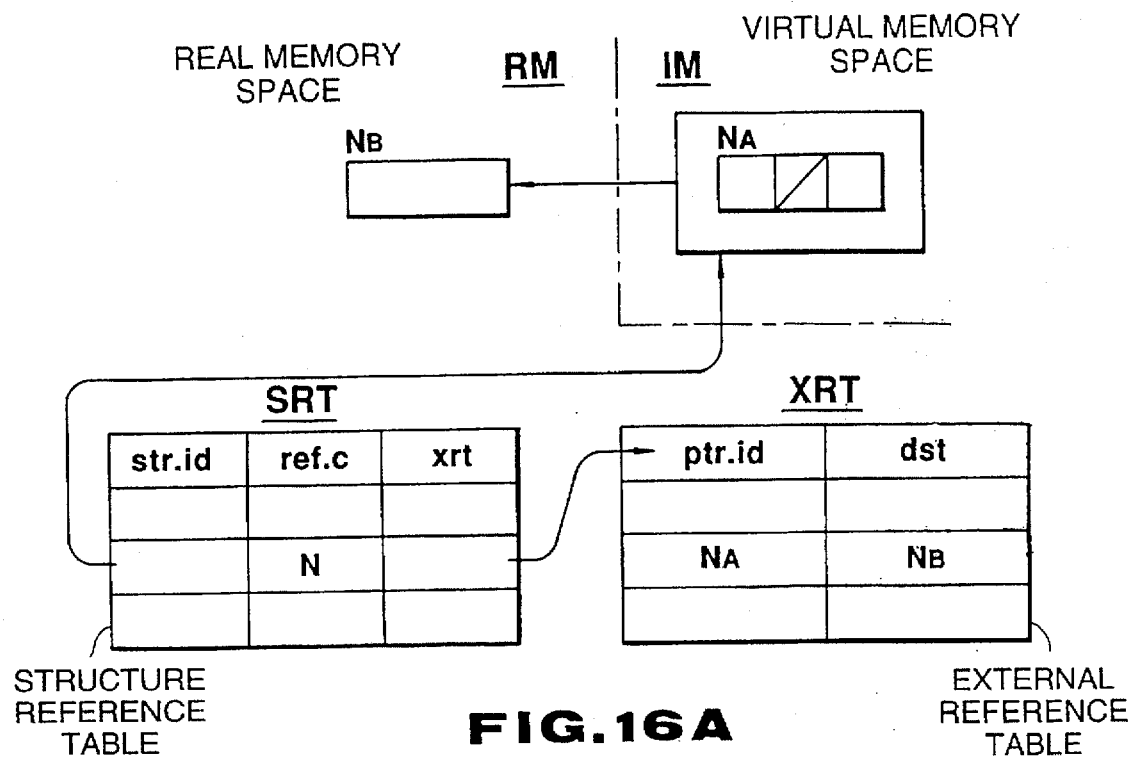
FIGS. 16A and 16B are diagram showing the organization of various reference tables used for collective control of the list structure units listed out in the virtual memory space.
Figure 16B:
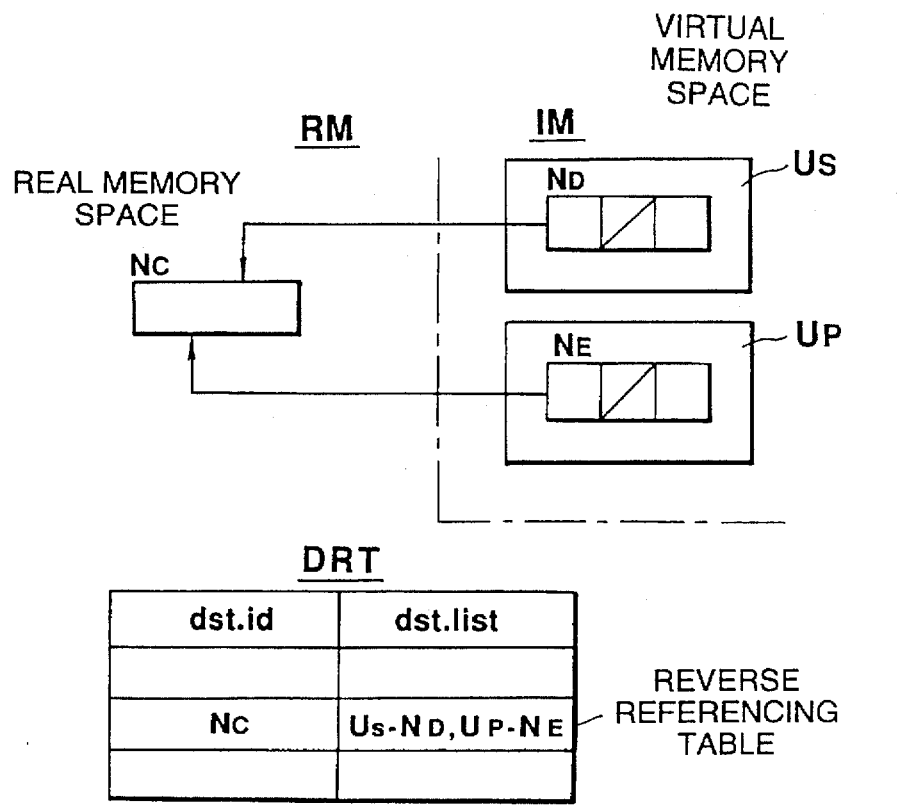

Thus, with this system, as shown in FIG. 16A, there are provided a structure reference table SRT for collectively controlling the list structure units listed out to the virtual memory space IM and an external reference table XRT for controlling the referencing to external nodes by the list structure unit listed out into the virtual memory space IM. There is also provided a reverse referencing table DRT for controlling the referencing from the virtual memory space IM to the real memory space RM for collectively handling referencing between the list structure units listed out into the virtual memory space to reduce the amount of accessing to the virtual memory space IM.

The structure reference table SRT contains data srt.id for specifying each list structur unit listed out to the virtual memory space R, the number of times ref. c of the references from the outside to the nodes of the list structure units, and pointers xrt to the external reference table XRT, and is used for controlling or retrieval of the external reference table XRT. The external reference table XRT contains data ptr. id allocated to each listed-out list structure unit and specifying the mode referencing to outside in the corresponding list structure unit, and pointers dst specifying the external nodes to which the node is referencing. The reverse reference table DRT contains data specifying the nodes in the virtual memory space IM referencing to the nodes in the real memory space RM with the list structures as units and data specifying the nodes on the real memory space RM.

In making entries to the reference tables SRT, XRT and DRT, it suffices to hash the structure reference table SRT, external reference table XRT and the reverse reference table DRT by the structure number of the list structure unit, in-structure addresses of the list structure unit and by the real memory space addresses, respectively, and high speed retrieval of the reference tables SRT, XRT or DRT may be realized. Although hashing to the reverse reference table DRT cannot be made if no reference node exists in the real memory space, the reverse reference pointers from the nodes of the list structure unit in the virtual memory space may be used as entries to the reverse reference table DRT.

Although the binary tree type list structure data are controlled in the above embodiment, the list structure data that may be handled in the data control system according to the present invention are not limited to a binary tree type list structure data, but may be expanded to a n-nary type list structure data. On the other hand, the data control system according to the present invention may be applied not only to the multi-processor system such as described in the above embodiment, but to a generalized processor system as well.

As described above, with the data control system of the present invention, the pointers are indicated by the addresses in the real memory space and by the addresses in the virtual memory space and the addresses to the real memory space in the virtual memory space, and nodes in the virtual memory space are indirectly referenced from the nodes in the real memory space, so that data of a structure in which near-by nodes are linked by pointers are represented across the real memory space and the virtual memory space to obviate the necessity of representing the whole memory area by pointers to actieve a saving in memory capacity to effectively increase the memory capacity.

Also, with the data control system of the present invention, data of the structure in which the near-by nodes are linked by the pointers are moved between the real memory space and the virtual memory space with the use of the link data and with the list structures as units, so that dynamic data may be controlled without statically splitting the dynamic data and with the dynamic data remaining unchanged, with the result that the number of times of accessing to the virtual memory space may be reduced to improve the memory accessing efficiency significantly. Above all, the efficiency of garbage collection may be improved significantly with extremely high effects.

Hence, with the use of the data control system of the present invention, virtualization of the list structure data which are basic and indispensable in the field of symbol manipulation such as artificial intelligence, formula manipulation or natural language manipulation may be realized efficiently.

What is claimed is:

1. A data control system for a computer's main memory for efficiently realizing virtualization of list structure data lying across a real memory space and a virtual memory space, comprising:

a real memory space having nodes linked by pointers, with the pointers being represented by addresses in the real memory space;

a virtual memory space having nodes linked by pointers, with the pointers being represented by addresses in the virtual memory space and addresses to the real memory space, and wherein the nodes in the virtual memory space are referenced to the nodes in the real memory space by indirect pointers represented by addresses of pointers in the real memory space and addresses of pointers in the virtual memory space;

means for moving the list structure data between the real memory space and the virtual memory space as list structure units; and monitoring means for monitoring the number of the free nodes in the real memory space and, when the free nodes in the real memory space have become depleted, recovering unnecessary nodes as free nodes by way of a garbage collecting operation.

2. A data control system for a computer's main memory according to claim 1, further comprising:

reverting means controlled by the monitoring means for causing the computer to revert to a data processing operation when the number of the free nodes exceeds a predetermined threshold value Sh as a result of the garbage collection;

extracting means controlled by the monitoring means for detecting when the number of the free nodes does not exceed the predetermined threshold value Sh as a result of the garbage collection, extracting pointers to the unnecessary list data in the real memory space and performing a list-out operation in the real memory space for swapping out data of the list structure units from the real memory space to the virtual memory space;

listing out means controlled by the monitoring means for detecting when the number of data of the list structure units listed out in the real memory space is less than a predetermined threshold Ss and listing out pointers to the unnecessary list data in the real memory space and repeatedly listing out the new list data in the real memory space, and swapping means controlled by the monitoring means for detecting when the number of data of the list structure units listed out in the real memory space reaches the threshold value Ss, swapping the data of the list structure units listed out in the real memory space from the real memory space into the virtual memory space and terminating the listing-out operation.

* * * * *

UNITED STATES PATENT AND TRADEMARK OFFICE
CERTIFICATE OF CORRECTION

PATENT NO. : 5,694,599
DATED : December 2, 1997
INVENTOR(S) : HIROTOSHI MAEGAWA ET AL.

It is certified that error appears in the above-identified patent and that said Letters Patent is hereby corrected as shown below:

On the title page, item [54] and Col. 1,

In the title, line 5, "LIVING" should be "LYING"

Signed and Sealed this

Twenty-eighth Day of April, 1998

*Attest:*

BRUCE LEHMAN

*Attesting Officer*  *Commissioner of Patents and Trademarks*